(12) United States Patent
Fromm et al.

(10) Patent No.: US 9,289,947 B1
(45) Date of Patent: Mar. 22, 2016

(54) SYSTEM FOR AIR CLEANING PRECISION RAILS IN THREE-DIMENSIONAL OBJECT PRINTING SYSTEMS

(71) Applicant: Xerox Corporation, Norwalk, CT (US)

(72) Inventors: Paul M. Fromm, Rochester, NY (US); Jeffrey J. Bradway, Rochester, NY (US); Steven M. Russel, Bloomfield, NY (US); Erwin Ruiz, Rochester, NY (US); Jorge M. Rodriguez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/575,142

(22) Filed: Dec. 18, 2014

(51) Int. Cl.
*B29C 67/00* (2006.01)
*B33Y 30/00* (2015.01)
*B33Y 40/00* (2015.01)

(52) U.S. Cl.
CPC ......... *B29C 67/0096* (2013.01); *B29C 67/0059* (2013.01); *B33Y 30/00* (2014.12); *B33Y 40/00* (2014.12)

(58) Field of Classification Search
CPC B29C 67/0096; B29C 67/0059; B33Y 30/00; B33Y 40/00
USPC ........... 425/225, 232; 104/279; 134/109, 110, 134/172, 198, 199
See application file for complete search history.

(56) References Cited

U.S. PATENT DOCUMENTS

| | | | | |
|---|---|---|---|---|
| 893,878 | A * | 7/1908 | Shires | B29C 73/10 126/271.1 |
| 1,187,209 | A * | 6/1916 | Warner | A47L 5/14 104/279 |
| 6,145,521 | A * | 11/2000 | Wu | B08B 3/022 134/104.4 |
| 6,444,046 | B1 * | 9/2002 | Hillbrand | E01H 1/103 104/279 |
| 7,721,647 | B2 | 5/2010 | Strauss et al. | |
| 2002/0023564 | A1 | 2/2002 | Oehara et al. | |
| 2008/0216702 | A1 | 9/2008 | Leonowicz | |
| 2013/0293653 | A1 | 11/2013 | Spence et al. | |
| 2014/0125749 | A1 | 5/2014 | Spence | |

FOREIGN PATENT DOCUMENTS

FR 378167 A * 9/1907 .............. E01H 8/125

* cited by examiner

*Primary Examiner* — Robert B Davis
(74) *Attorney, Agent, or Firm* — Maginot Moore & Beck LLP

(57) ABSTRACT

A system for cleaning precision rails of a three-dimensional object printer has been developed. The printer includes a track having a pair of precision rails positioned beneath a printing station having an ejector head configured to eject drops of material onto a substrate of a cart that moves along the rails. An air source with a duct is configured with a slot to direct an air flow onto one of the precision rails to prevent dust or other airborne particles from collecting on the precision rail.

17 Claims, 4 Drawing Sheets

SYSTEM FOR AIR CLEANING PRECISION RAILS IN THREE-DIMENSIONAL OBJECT PRINTING SYSTEMS

TECHNICAL FIELD

The system disclosed in this document relate to printers that produce three-dimensional objects and, more particularly, to cleaning precision rails in such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Typically, ejector heads, which are similar to printheads in document printers, include an array of ejectors that are coupled to a supply of material. Ejectors within a single ejector head can be coupled to different sources of material or each ejector head can be coupled to different sources of material to enable all of the ejectors in an ejector head to eject drops of the same material. Materials that become part of the object being produced are called build materials, while materials that are used to provide structural support for object formation, but are later removed from the object are known as support materials. Three-dimensional printing is distinguishable from traditional object-forming techniques, which mostly rely on the removal of material from a work piece by a subtractive process, such as cutting or drilling.

A prior art three-dimensional object printing system 10 is shown in FIG. 3. In the view depicted in that figure, a platform 14, called a cart, includes wheels 18 that ride upon track rails 22 to enable the cart to move in a process direction P between printing stations, such as the printing station 26 shown in FIG. 3. Printing station 26 includes four ejector heads 30 as shown in the figure, although fewer or more ejector heads can be used in a printing station. Once the cart 14 reaches the printing station 26, the cart 14 transitions to enable bearings 34 to roll upon precision rails 38. Precision rails 38 are cylindrical rail sections that are manufactured within tight tolerances to help ensure accurate placement and maneuvering of the cart 14 beneath the ejector heads 30. Linear electrical motors are provided within housing 42 and are operatively connected to the wheels 18 of cart 14 to move the cart along the track rails 22 and to the bearings 34 to maneuver the cart 14 on the precision rails 38. Once the cart 14 is beneath the printing station 26, ejection of material occurs in synchronization with the motion of the cart. The electrical motors in housing 42 are also configured move the cart in an X-Y plane that is parallel to the ejector heads 30 as layers of material are formed in the object. Additional motors (not shown) move the printing station 26 vertically with respect to the cart 14 as layers of material accumulate to form an object. Alternatively, a mechanism can be provided to move the cart 14 vertically with respect to rails 38 as the object is formed on the top surface of the cart. Once the printing to be performed by a printing station is finished, the cart 14 is moved to another printing station for further part formation or for layer curing or other processing.

An end view of the prior art system 10 is shown in FIG. 4. That view depicts in more detail the wheels 18 on which the cart 14 rides the track rails 22. Bearings 34 of the cart 14 are positioned on the precision rails 38 in an arrangement that facilitates accurate positioning of the build platen on the cart 14. Specifically, bearings 34 are positioned at a right angle to one another on one of the rails 38 to remove 4 degrees of freedom of the cart 14, while the other bearing 34 rests on the other rail 38 to remove one more degree of freedom. A linear motor operates to move the cart 14 over an upper surface 50 of the housing 42. The motor has a stationary motor segment within the housing 42 and a magnet 46 mounted to the underside of the cart 14. Gravity and magnetic attraction between the stationary motor segment and the magnet 46 hold the bearings 34 in contact with the rails 38.

When carts are not present underneath the ejector heads 30, errant drips of materials can fall from the ejector heads and produce undesired debris and contamination on the precision rails 38 and the housing 42. Also, air-borne contaminants in the environment, such as dust or other particulate matter, can fall and collect on the rails 38 and the housing 42. When these contaminants and debris are located at any interface between the bearings 34 and the rails 38, the linear velocity of the cart is disrupted and the quality of the printed object is affected. Similarly, when these materials are within the gap between the top surface 50 of the housing 42 and the magnet 46, the magnetic attraction can be affected and enable the cart to be less constrained. Additionally, the collection of material drops on top of the housing 42 can also affect the dissipation of heat from the motor and cause motion quality disturbances, impacting the performance and reliability of the motor. In order to produce three-dimensional objects with acceptable quality, the motion of the cart 14 beneath the ejector heads 30 needs to be precise. Therefore, improvements in three-dimensional printing systems that help eliminate the contamination on the precision rails and motor housing that affects the accuracy of the placement and movement of the cart would be beneficial.

SUMMARY

A three-dimensional object printing system that cleans precision rails of the printing system includes a track having a first rail; at least one ejector head disposed along the track, the at least one ejector head being configured to eject drops of a material onto a substrate; a platform configured to move along the track to convey the substrate to a position to enable the at least one ejector head to eject drops of the material onto the substrate; and a first air source having a duct with a slot positioned parallel to the first rail of the track, the slot being configured to direct air onto the first rail.

An apparatus that cleans precision rails of a three-dimensional object printing system includes a first air source configured to produce an air flow; and a first duct having a slot, the first duct and slot being positioned within the three-dimensional object printer to enable the slot of the first duct to direct air along a first rail of the three-dimensional object printer

BRIEF DESCRIPTION OF THE DRAWINGS

The foregoing aspects and other features of a cart that helps eliminate the collection of materials from the ejectors heads and other debris are explained in the following description, taken in connection with the accompanying drawings.

DETAILED DESCRIPTION

Figure 1:
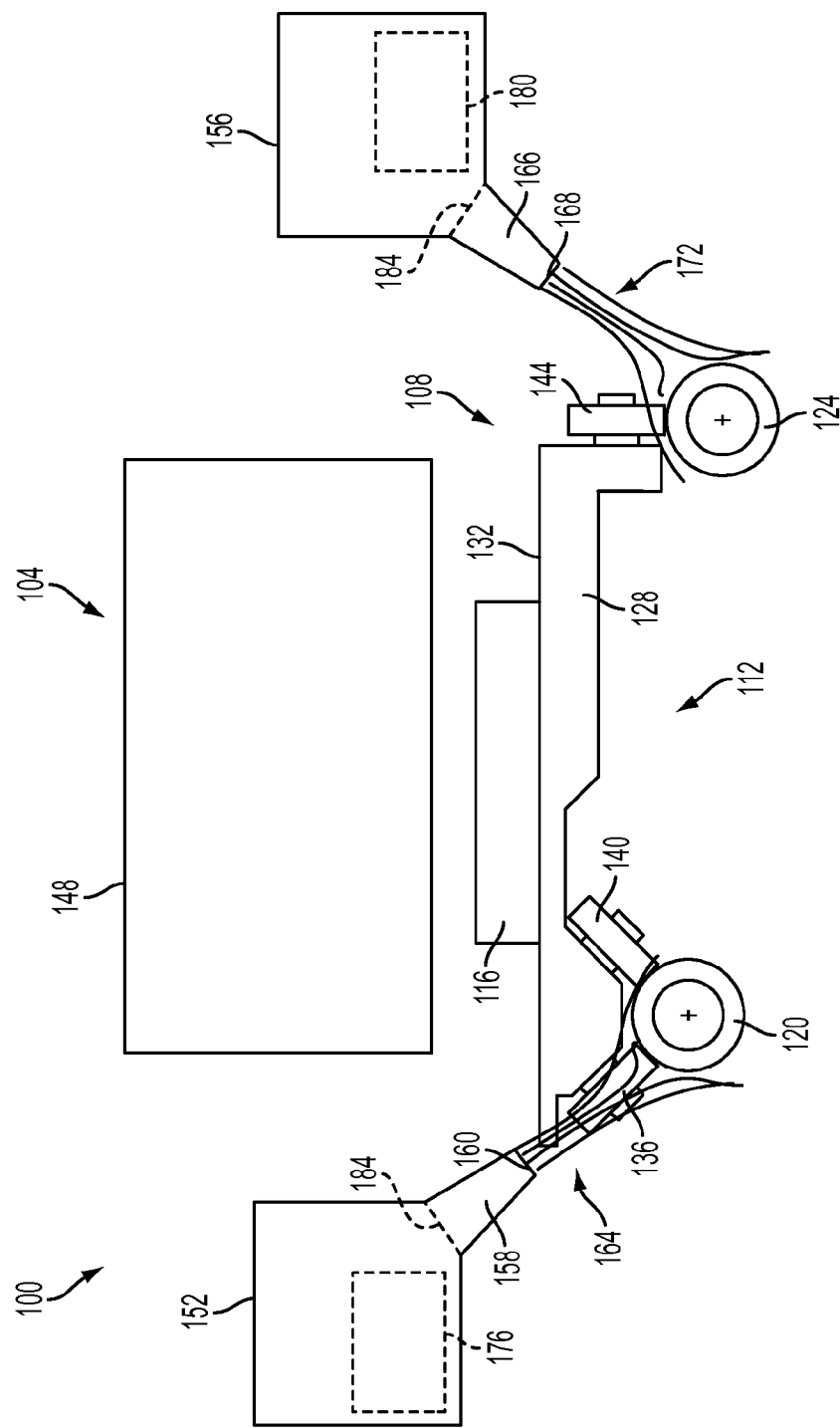
FIG. 1 depicts a portion of a three-dimensional object printing system with a cart positioned at printing station.

For a general understanding of the environment for the system and method disclosed herein as well as the details for the system and method, reference is made to the drawings. In the drawings, like reference numerals designate like elements FIG. 1 depicts a portion of a three-dimensional object printer 100 near a printing station 104 of the printer 100. A cart 108 is movable along a track 112 to convey a substrate 116 to the printing station 104. The printing station 104 is positioned above the track 112 and configured to eject material onto the substrate 116 to form a three-dimensional object.

The track 112 includes a pair of high precision rails 120 and 124. The rails 120 and 124 are each substantially cylindrical having a circular cross sectional shape with a diameter of approximately 20 mm. The rails 120 and 124 have lengths that extend parallel to one another to guide the cart 108 as it moves along the track 112. The rails 120 and 124 are fabricated with tight tolerances to enable precise positioning of the cart 108. The particular details of the rails 120 and 124 are shown for illustrative purposes. Alternative embodiments may include tracks having only one rail or tracks having more than two rails. The rails may be any shape and size that is suitable for engaging with a cart that is movable along the track. Furthermore, the rails may differ from one another in shape and size depending on the configuration of the cart.

The cart 108 is configured to engage the rails 120 and 124 and move along the track 112, which is approximately horizontal. The cart 108 includes a platform 128 having an upper surface 132 for conveying the substrate 116 to the print station 104. The upper surface 132 is substantially planar and parallel with the length of the track 112. The cart 108 has bearings 136 and 140 that are configured to engage with the rail 120. The bearings 136 and 140 have rotational axes, which lie in a plane that is perpendicular to the length of the rail 120 and are perpendicular to one another in that plane and positioned symmetrically around a vertical axis that bisects the right angle between the rotational axes. In this way, the bearings 136 and 140 are configured at a right angle to one another and may rotate about their rotational axes to roll along the length of the rail 120. A second set of bearings 136 and 140 is mounted on the cart 132 at a distance from the first set of bearings in a direction that is parallel to the precision rail 120. The first and second sets of orthogonal bearings remove four degrees of freedom of the cart. The cart 108 also has a bearing 144 that is configured to engage rail 124. The bearing 144 rotates about an axis that is horizontal while the body of bearing 144 is tangent to an upper surface of the rail 124. In this way, the bearing 144 is oriented vertically relative to the cart 108 and so it can rotate about its rotational axis along the length of the rail 124. Bearing 144 removes a fifth degree of freedom of the cart to enable the cart to translate only along the rails 120 and 124. The quantity, positioning, and orientation of the bearings shown and described is for illustrative purposes. Alternative embodiments may include any configuration that is suitable to enable the cart 108 to move along the track 112.

The printing station 104 has an ejector head 148 configured to eject drops of material onto the substrate 116 to form a three-dimensional object. The printer 100 is configured so that the cart 108 is moved relative to the ejector head 148 in the necessary directions to enable the printing station 104 to print a three-dimensional object. The printer 100 can be also configured so that the ejector head 148 is moved relative to the cart 108 both vertically and horizontally in a direction perpendicular to the axis of the track 112. The printing station 104 can include a plurality of ejector heads for various materials disposed in series along the track 112. For example, ejector heads may be included for various colors of build material, such as cyan, magenta, yellow, and black build materials, and for a support material, such as wax.

The printer 100 further includes a pair of air sources 152 and 156 configured to produce a flow of air that is directed onto the rails 120 and 124, respectively. The air flow can be produced, for example, by a motor rotating a fan or the like. The air source 152 has a duct 158 with a slot 160 that extends in parallel to the length of the rail 120. The slot 160 is configured to direct an air flow 164 onto the rail 120 at an angle that aligns with a radial extending from a center of the rail 120. The slot 160 has a width of approximately 5 mm and is positioned approximately 20 mm away from the rail 120. Similarly, the air source 156 has a duct 166 with a slot 168 that extends in parallel to the length of the rail 124. The slot 168 is configured to direct an air flow 172 onto the rail 124 at an angle that aligns with a radial extending from a center of the rail 124. The slot 168 has a width of approximately 5 mm and is positioned approximately 20 mm away from the rail 124. This configuration enables the slots 160 and 168 in the ducts 158 and 166 to direct a stream of air onto the rails 120 and 124 and remove unwanted debris from the rails, particularly dust and other airborne contaminants. Generally, the slots 160 and 168 in the ducts 158 and 166 are positioned above and laterally away from the track 112 so the slots 160 and 168 in the ducts 158 and 166 do not obstruct the cart 108 moving along the track 112. Furthermore, the air flow is directed beneath the track 112 to keep dust or other airborne particles from being blown onto the cart 108 or into the ejector head 148 of the printing station 104.

The particular dimensions and positioning of the slots described herein are for illustrative purposes and depend, in practice, upon the dimensions and shape of each rail. Generally, the air ducts and slots are configured to produce a mild breeze that impinges on and splits across the rails, flowing at least halfway around the rails. The width of the slots and the distance of the slots from the rails are configured to maximize the slots' effectiveness in preventing unwanted debris from collecting on the rails. This stream of air is intended to deflect unwanted debris away from the rails preventing the debris from ever contacting the rail. Alternatively the air velocity can be increased to the point where it can also dislodge any particles that have landed on the rails for any reason such as if the air stream was turned off. For example, if a slot is too narrow or a rail is too broad, then a substantial portion of the air flow bounces off the rail rather than moving around the rail. On the other hand, if a slot is excessively wide, then the velocity of the air flow can be reduced to a point where the flow is ineffective. For a cylindrical rail, a slot has been empirically determined to be effective when positioned at a distance from the rail about equal to the diameter of the rail and having a width about equal to one fourth of the diameter of the rail.

In order for the air sources 152 and 156 to be most effective at preventing the collection of dust and other airborne particles on the rails, the air flow produced by the air sources 152 and 156 should be free of dust or other airborne particles. To this end, the air sources 152 and 156 can further comprise electrostatic precipitators 176 and 180 positioned within the ducts 158 and 166 to remove particles from the air flow of the air sources 152 and 156 prior to the air flow being directed onto the rails 120 and 124. The electrostatic precipitators 176 and 180 can be located at other positions within the air ducts 152 and 156, or they can be located outside the ducts 158 and 166 at the slots 160 and 168 to remove particles from the air flow exiting the slots. Generally, the electrostatic precipitators 176 and 180 cause particles in the air flow to have an electrostatic charge. The rails 120 and 124 may be further configured to have an electrostatic charge of the same polarity of the particles. In this way, the rails 120 and 124 can repel any particles in the air flow charged by the electrostatic precipitators 176 and 180. Other methods of cleaning or filtering the air flow of the air ducts 152 and 156 may also be implemented. For example, either in addition to or in substitution of the electrostatic precipitators 176 and 180, a porous media filter 184 can be positioned to remove particles from the air flow as shown in FIG. 1.

Figure 2:
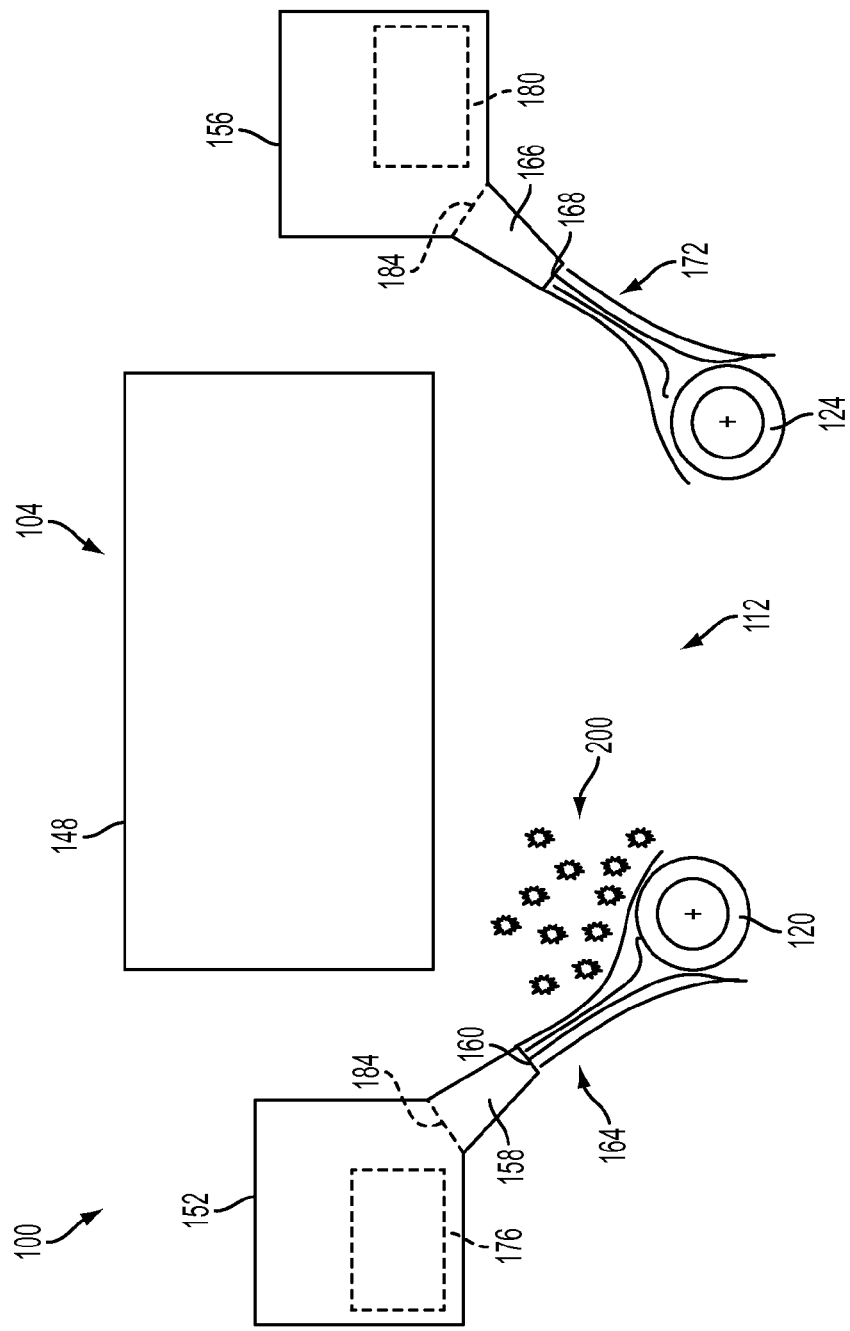
FIG. 2 depicts the portion of a three-dimensional object printing system of FIG. 1 with the cart moved away from the printing station.
Figure 3:
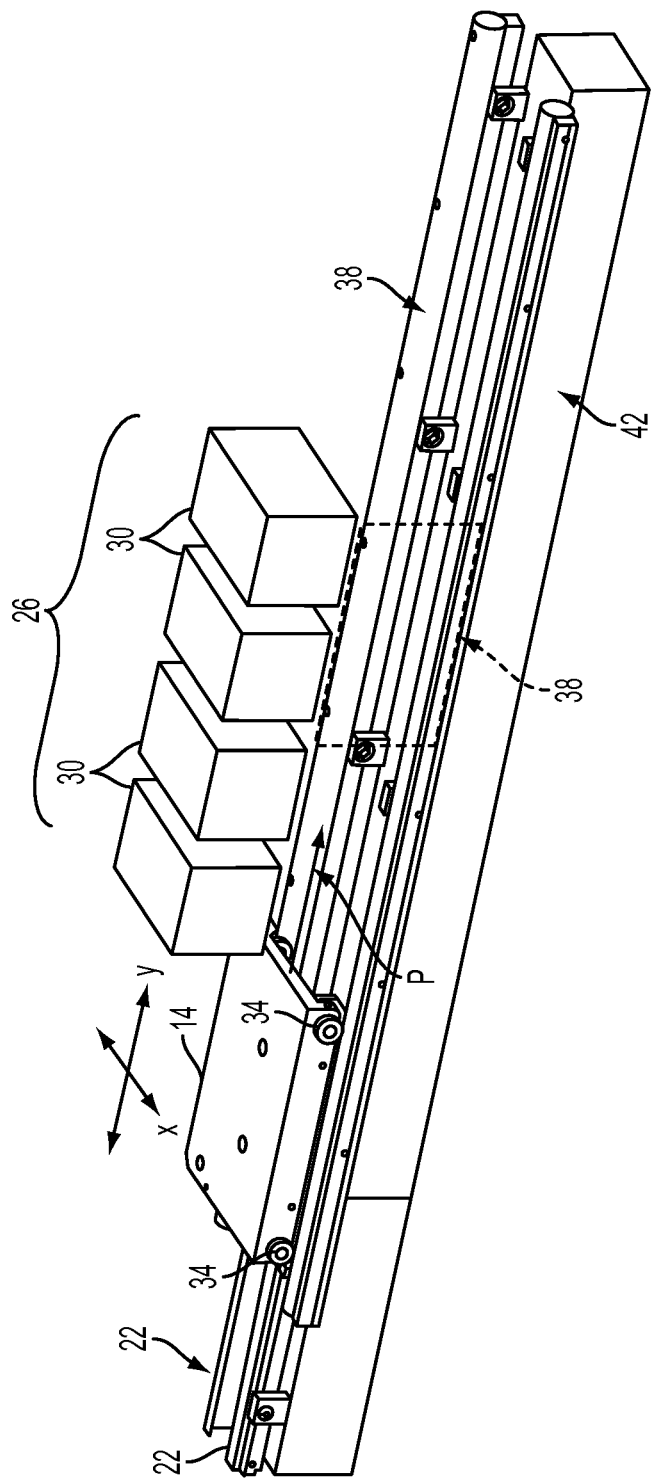
FIG. 3 depicts a prior art three-dimensional object printing system.
Figure 4:
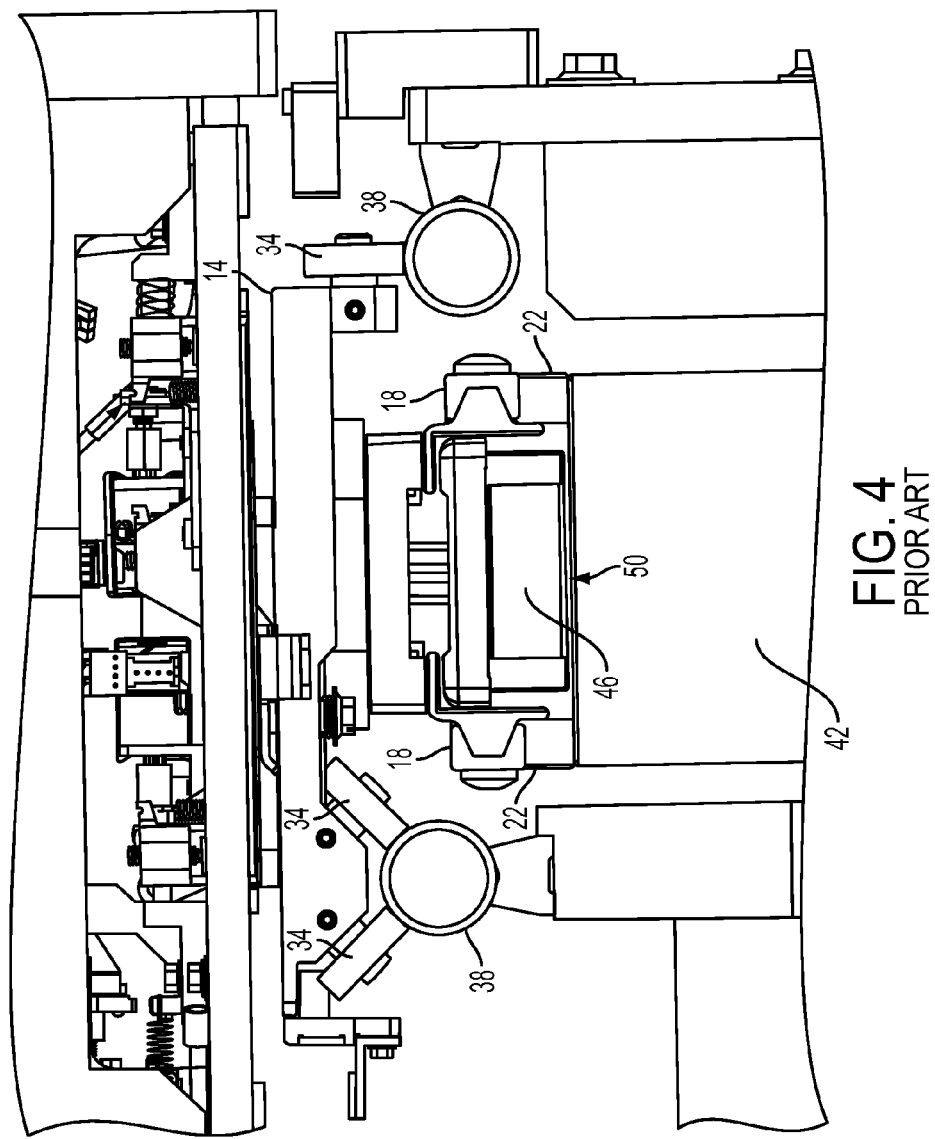
FIG. 4 shows an end view of the prior art three-dimensional objecting printing system of FIG. 3.

FIG. 2 depicts the same portion of a three-dimensional object printer 100 as shown in FIG. 1. However, in FIG. 2 the cart 108 has moved away from the print station 104. Dust particles 200 are floating near the rail 120. The slot 160 directs the air flow 164 onto the exposed rail 120 to enable a curtain of air to flow around the rail 120 and deflect the particles 200 so the particles do not collect on the rail 120. Instead, the particles 200 float down and collect beneath the track 112. The particles 200 can be periodically removed from beneath the track 112 or cleared away with conventional particulate collection systems.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A three-dimensional object printer comprising:
   a track having a first rail;
   at least one ejector head disposed along the track, the at least one ejector head being configured to eject drops of a material onto a substrate;
   a platform configured to move along the track to convey the substrate to a position to enable the at least one ejector head to eject drops of the material onto the substrate; and
   a first air source having a duct with a slot positioned parallel to the first rail of the track, the slot being configured to direct air onto the first rail.

2. The printer of claim 1, the track further comprising:
   a second rail; and the printer further comprising:
   a second air source having a duct with a slot positioned parallel to the second rail, the slot being configured to direct air onto the second rail.

3. The printer of claim 1 further comprising:
   an electrostatic precipitator configured to remove particles from the air before the slot and duct of the first air source direct the air onto the first rail.

4. The printer of claim 3, the electrostatic precipitator being further configured to charge the particles with a polarity to which the first rail of the track is charged.

5. The printer of claim 1, wherein the first rail of the track is cylindrical; and
   the slot and the duct of the first air source are further configured to direct the air onto the first rail of the track at an angle that aligns with a radial extending from a center of the first rail.

6. The printer of claim 5, wherein the slot of the duct of the first air source has a width that is about equal to one fourth of a diameter of the first rail.

7. The printer of claim 5, wherein the slot of the duct of the first air source is positioned at a distance from the first rail that is about equal to a diameter of the first rail.

8. The printer of claim 1, wherein the slot of the duct of the first air source is laterally displaced from the track.

9. The printer in in claim 1 further comprising:
   a porous filter positioned to remove particles from the air before the air exits the slot of the duct.

10. An apparatus for keeping particulate matter off rails in a three-dimensional object printer comprising:
    a first air source configured to produce an air flow;
    a first duct having a slot, the first duct and slot being positioned within the three-dimensional object printer to enable the slot of the first duct to direct air along a first rail of the three-dimensional object printer; and
    an electrostatic precipitator configured to remove particles from the air before the first duct and slot directs air onto the first rail.

11. The apparatus of claim 10 further comprising:
    a second air source configured to produce an air flow; and
    a second duct having a slot, the second duct and slot being positioned within the three-dimensional object printer to enable the slot of the second duct to direct air along a second rail that is parallel to and separated from the first rail.

12. The apparatus of claim 10, the electrostatic precipitator being further configured to charge the particles with a polarity to which the first rail is charged.

13. The apparatus of claim 10, the slot of the first duct being further configured to direct air onto the first rail at an angle that aligns with a radial extending from a center of the first rail.

14. The apparatus of claim 10, the slot of the first duct being further configured with a width that is about equal to one fourth of a diameter of the first rail.

15. An apparatus for keeping particulate matter off rails in a three-dimensional object printer comprising:
    a first air source configured to produce an air flow; and
    a first duct having a slot, the first duct and slot being positioned within the three-dimensional object printer to enable the slot of the first duct to direct air along a first rail of the three-dimensional object printer, and the slot of the first duct being positioned at a distance from the first rail that is about equal to a diameter of the first rail.

16. The apparatus of claim 10, wherein the slot of the first duct is laterally displaced from the track.

17. An apparatus for keeping particulate matter off rails in a three-dimensional object printer comprising:
    a first air source configured to produce an air flow;
    a first duct having a slot, the first duct and slot being positioned within the three-dimensional object printer to enable the slot of the first duct to direct air along a first rail of the three-dimensional object printer; and
    a porous filter positioned to remove particles from the air before the slot of the first duct directs the air onto the first rail.

* * * * *